United States Patent [19]

Marek

[11] Patent Number: 5,233,213

[45] Date of Patent: Aug. 3, 1993

[54] SILICON-MASS ANGULAR ACCELERATION SENSOR

[75] Inventor: Jiri Marek, Reutlingen, Fed. Rep. of Germany

[73] Assignee: Robert Bosch GmbH, Stuttgart, Fed. Rep. of Germany

[21] Appl. No.: 893,904

[22] Filed: Jun. 4, 1992

Related U.S. Application Data

[63] Continuation of Ser. No. 716,817, Jun. 17, 1991.

[30] Foreign Application Priority Data

Jul. 14, 1990 [DE] Fed. Rep. of Germany ....... 4022464

[51] Int. Cl.$^5$ .......................................... H01L 29/84
[52] U.S. Cl. .................... 257/415; 257/417; 257/418; 257/419; 257/415; 73/517 A; 73/777; 73/517 R; 280/735; 338/5; 361/283
[58] Field of Search ........................ 357/25, 26, 51, 55, 357/59; 280/735; 338/5; 73/760, 768, 777, 517 A, 517 R; 361/280, 283; 257/415, 417, 418, 419

[56] References Cited

U.S. PATENT DOCUMENTS

| | | | |
|---|---|---|---|
| 2,963,911 | 12/1960 | Courtney-Pratt et al. | 73/517 |
| 4,104,920 | 8/1978 | Albert et al. | 73/517 |
| 4,244,225 | 1/1981 | Greenwood | 73/517 |
| 4,507,705 | 3/1985 | Hoshino et al. | 361/283 |
| 4,574,327 | 3/1986 | Wilner | 361/283 |
| 4,663,772 | 5/1987 | Mattson et al. | 378/18 |
| 4,711,128 | 12/1987 | Boura | 73/517 B |
| 4,825,335 | 4/1989 | Wilner | 73/718 X |
| 4,920,800 | 5/1990 | Boura | 73/517 R |
| 4,951,510 | 8/1990 | Holm-Kennedy et al. | 73/862.04 |
| 4,955,234 | 9/1990 | Marek | 73/517 |
| 4,990,986 | 2/1991 | Murakami et al. | 357/25 X |
| 5,121,180 | 6/1992 | Beringhause et al. | 73/517 A X |

FOREIGN PATENT DOCUMENTS

| | | |
|---|---|---|
| 3611969 | 10/1986 | Fed. Rep. of Germany . |
| 3625411 | 2/1988 | Fed. Rep. of Germany . |
| 4000903 | 8/1990 | Fed. Rep. of Germany . |
| 3927163 | 2/1991 | Fed. Rep. of Germany . |
| 4016471 | 11/1991 | Fed. Rep. of Germany . |
| 4016472 | 11/1991 | Fed. Rep. of Germany . |
| 56-133877 | 10/1981 | Japan . |
| 9101010 | 1/1991 | PCT Int'l Appl. . |

OTHER PUBLICATIONS

Kern, "Chemical Etching of Silicon, Germanium, Gallium Arsenide, and Gallium Phosphide," *RCA Review*, vol. 39, Jun. 1978, p. 273.

Allen et al., "Accelerometer Systems with Self-Testable Features," *Sensors and Actuators*, 20 (1989), pp. 153-161.

W. C. Tang et al., "Laterally Driven Polysilicon Resonant Microstructures", vol. 20, Sensors & Actuators, pp. 53-59, IEEE 1989.

*Primary Examiner*—William Mintel
*Attorney, Agent, or Firm*—Frishauf, Holtz, Goodman & Woodward

[57] ABSTRACT

From a silicon block or wafer a stationary frame is shaped and a seismic mass which is displaceable in rotation is mounted within the frame. The seismic mass is symmetrically suspended in the frame by two pairs of oppositely located flexible strips and either piezoresistive or capacitive detection of rotation is provided by the strips, the capacitive detection beeing provided with the help of parallel stationary electrodes connected to and insulated in the frame. In another embodiment an anchor stud in the center of the frame has two flexible interlaced spirals extending therefrom and their respective outer turns carry radial disposed masses with finger structures extending circumferentially in both directions. Stationary finger structures are provided to provide interfitting variable capacitors sensitive to rotary displacements.

61 Claims, 5 Drawing Sheets

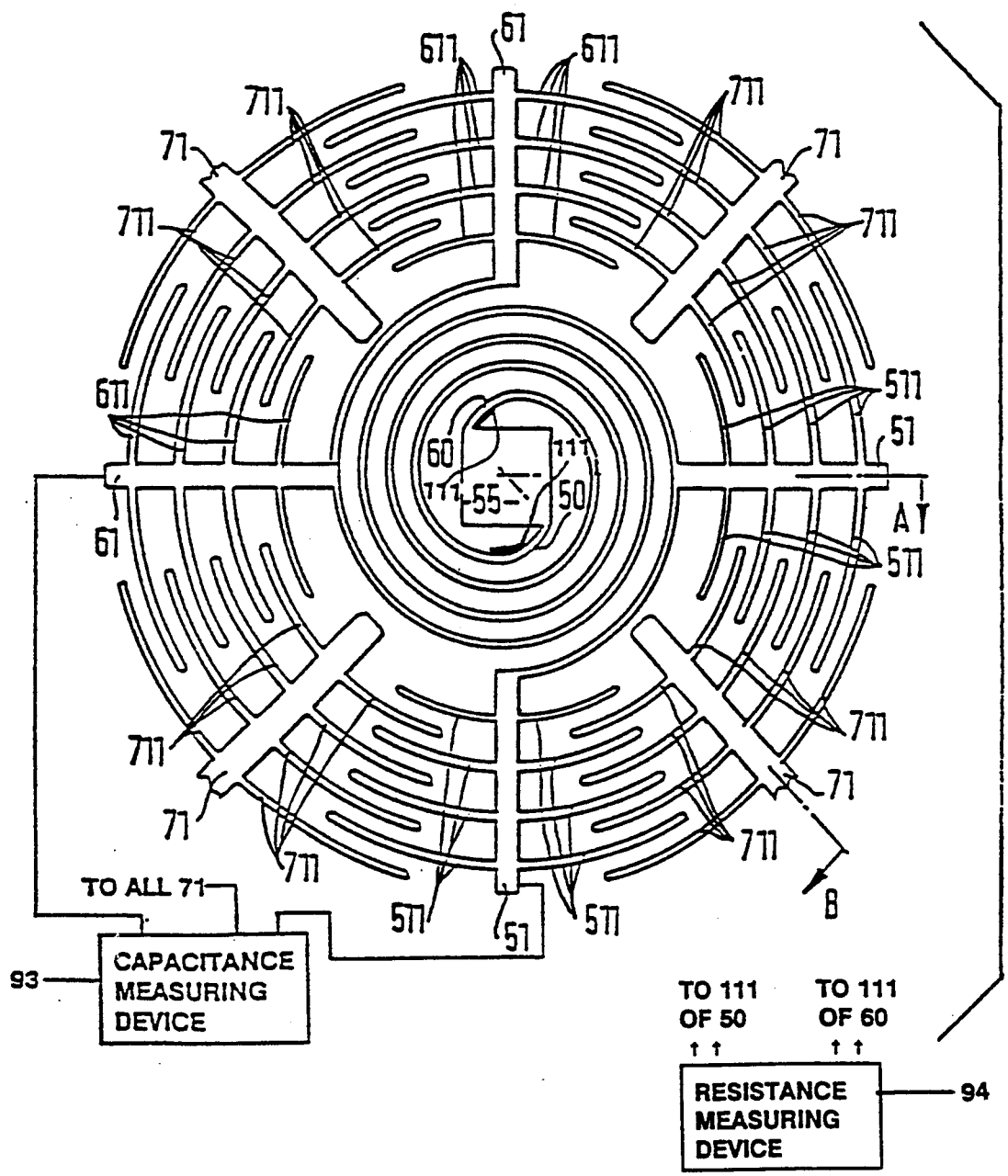

SILICON-MASS ANGULAR ACCELERATION SENSOR

This application is a continuation of application Ser. No. 07/716,817, filed Jun. 17, 1991.

Cross-reference to related patent and applications, assigned to Robert Bosch GmbH, assignee of the present application, the disclosures of which are hereby incorporated by reference: U.S. Pat. No. 4,955,234, MAREK, issued Sep. 11, 1990=DE 38 14 952, U.S. Pat. No. 5,151,763, MAREK, BANTIEN, HAACK & WARTH, issued Sep. 29, 1992=DE 40 00 903; German Patent Disclosure DE 40 16 471.3, filed May 22, 1990 and corresponding U.S. Pat. No. 5,148,604, BANTIEN, issued Sep. 22, 1992, German Patent Disclosure DE 40 16 472.1, filed May 22, 1990 and corresponding U.S. Ser. No. 07/701,880, BANTIEN & FINDLER, May 17, 1991; German Patent Disclosure DE 39 27 163 and corresponding International Application PCT/DE 90/00596, German Patent Disclosure DE 36 09 841, filed Mar. 22, 1986, and Published International Application WO 87/05569, HEINTZ et al.

FIELD OF THE INVENTION

This invention concerns a sensor for angular acceleration producible out of a base of silicon in a manner which provides a stationary frame and a seismic mass which is displaceable within the frame at an angle of rotation that can be measured to determine the angular acceleration.

In U.S. Pat. No. 5,151,763 acceleration sensor is described which is made of a monocrystalline two-layer carrier capable of vibrating parallel to the top and bottom surfaces of the carrier and a stationary electrode facing the tongue in the direction of oscillation. The acceleration is measured in this sensor by the capacitive change between the movable tongue and the stationary electrode.

In an article by W. C. Tang, T. H. Nguyen and R. T. Howe, "Laterally Driven Polysilicon Resonant "*Microstructures*" in Sensors & Actuators, Vol. 20 (I.E.E.E. 1989), pages 25-30, seismic masses are described which are suspended on archimedean spirals and are provided with an electrostatic comb drive. In that article the making of such structures in polysilicon technology is described.

Other references in the field of the invention of which the disclosures are hereby incorporated by reference are: German patent DE-PS 36 25 411, issued May 11, 1988; U.S. Pat. Nos. 4,549,926; 4,578,172; 4,585,513; 4,698,132 and the publication by W. Kern, "Chemical Etching of Silicon, Germanium, Gallium Arsenide, and Gallium Phosphide," RCA Review, June 1978, vol. 39, pp. 278-308.

SUMMARY OF THE INVENTION

It is an object of the present invention to provide a sensor of the silicon mass type which is sensitive to rotary acceleration in the plane of the silicon wafer out of which the device is made and insensitive to linear acceleration and to other angular accelerations.

Briefly, the seismic mass is connected to the frame by at least two symmetrically disposed strips which can be bent in the plane of the silicon carrier surface and a rotary displacement of the seismic mass is measured in that plane at at least two oppositely located sides of the seismic mass.

The sensor of the invention has the advantage that in the measurement of the displacement of the mass at at least two opposite sides of the mass it is possible to distinguish rotary movement from linear acceleration. According to the nature of the acceleration the measurement signals detected at different sides of the seismic mass are either in the same sense or in opposite senses. By comparison of the signals it is therefore particularly easy to distinguish between a rotary movement and a linear acceleration. There is also the advantage that the seismic mass is more readily displaceable in the plane of the carrier and therefore does not protrude above the surface of the carrier. The carrier itself advantageously provides protection against mechanical overload.

Suspension of the seismic mass by thin strips at least on two opposite sides increases the stability of the sensor against overload and at the same time provides high measurement sensitivity with low sensitivity against cross-accelerations.

Such a symmetrical suspension of the seismic mass is particularly advantageous for avoidance of cross-movement sensitivity. The manufacture of the sensor from a silicon carrier can be performed by standard processes to produce particularly compact devices. There is also the advantage that on a silicon carrier it is possible to integrate the evaluation circuits of the sensor.

The measurement of the displacement of the seismic mass can be advantageously performed piezoresistively by means of pairs of piezoresistances which are provided to the right and the left of the strip axis of the suspension strips. In the case of linear accelerations each pair of piezoresistances change in the same sense on every suspension strip. In the case of rotary movement there is extension of the piezoresistance at one side of a suspension strip while there is compression of the piezoresistive element on the other side of the suspension strip. That leads to opposite changes of the resistance values at each suspension strip. Such piezoresistive signal evaluation can also be advantageously be applie to sensors that are made of a single-layer carrier. The manufacture of narrow suspension strips occupying all of the carrier thickness is advantageous, since in that way displacements of the seismic mass within the space between the top and bottom surfaces of the carrier are favored, while displacements of the seismic mass perpendicular to the surfaces is suppressed.

It is particularly favorable to use two-layer silicon carriers for the manufacture and for isolation of part structures of the sensor, in which case there is a silicon doping transition between the upper and lower layers, preferably a pn junction. The carrier can be monocrystalline, in which case the upper layer can be produced by diffusion of doping atoms or else an epitaxy layer can be deposited on a carrier. According to the sensor structure it may be advantageous to use a silicon carrier having a polysilicon layer deposited thereon. In this case insulation is produced, for example, by a silicon oxide layer between the monocrystalline and polycrystalline silicon layers.

A further advantage is to be found in capacitive signal evaluation. For that purpose stationary electrodes are sculptured out of the silicon carrier which extend from two oppositely located sides of the frame and run parallel to the suspension strips for the seismic mass. A capacitor is formed in each case by these stationary electrodes and the suspension strips serving as movable electrodes. In the alternative, or for amplification of the signals, it is useful to provide additional stationary electrodes and, parallel thereto, additional movable electrodes which extend from the seismic mass and together with the stationary electrodes form interditigal capacitors. Another advantageous implementation of the invention is to use these capacitances for positioning control by applying a variable voltage by which the seismic mass can be brought back into its rest position. That provides a particularly favorable possibility of protection against overload. A combination of capacitive position control, capacitive signal evaluation and piezoresistive signal evaluation is also useful. The insulation of the movable electrodes with respect to the stationary electrodes can be particularly well provided if the suspension strips of the seismic mass are provided only in the upper layer. The pn junction between the upper and lower layer then insulates the electrodes from the lower layer; the insulation in the upper layer can be provided either by insulating diffusions or by providing etched troughs which penetrate fully through the upper layer.

A further useful embodiment of the sensor is provided when seismic masses are suspended on interlaced archimedean spirals which are provided with movable strips at the outer turns of the respective spirals. The movable strips have comb-like finger structures which form electrostatic reluctance drives with the finger structures extending from stationary strips. These interfitting finger structures can be used either for tapping off a signal or for position control. A supplementary signal tap can be provided by piezoresistances disposed on the spirals.

For increasing the sensitivity of the sensor the seismic mass can be provided in the full thickness of the carrier out of which it is made. By providing the seismic mass in the same thickness as that of the suspension either the moment of inertia or the cross sensitivity can be optimized.

BRIEF DESCRIPTION OF THE DRAWING

The invention is further described by way of illustrative example with reference to the annexed drawings, in which:

FIG. 5 is a plan view of a sensor with a suspension using archimedean spirals.

DESCRIPTION OF THE ILLUSTRATED EMBODIMENT.

Figure 1:
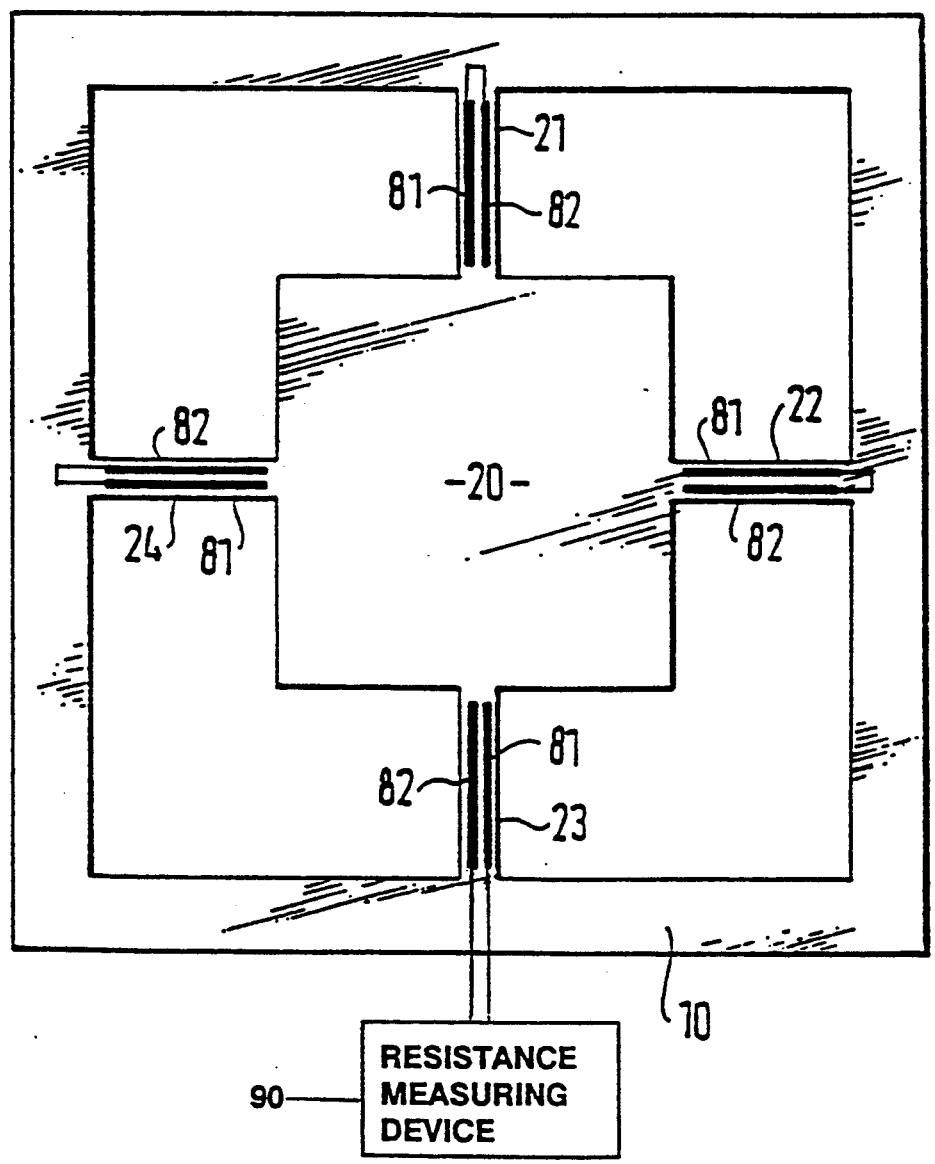
FIG. 1 is a plan view of a sensor with a piezoresistive signal output.

FIG. 1 shows a sensor having a stationary frame 10 and a displaceable seismic mass 20 attached therein. The seismic mass 20 is suspended symmetrically, in this case by four thin strips 21 to 24. This structure can be shaped out of a single-layer silicon carrier or a two-layer silicon carrier. The carrier can be monocrystalline or can be provided with a polysilicon layer. The strips 21 to 24 and the seismic mass 20 can be provided in the full thickness of the carrier or else they can be reduced in that thickness dimension. For increasing the sensitivity it is desirable to make the seismic mass 20 as great as possible, and therefore to make it of the full thickness of the carrier. When the strips 21 to 24 are thicker than they are wide, which is to say that they have a full carrier thickness, displacements within the carrier plane are favored in contrast to the suppression of displacements perpendicular to the carrier plane.

In the illustrative embodiment shown in FIG. 1 two piezoresistances 81 and 82 are applied to each of the strips 21 to 24. The two piezoresistances are respectively disposed to the right and left of the strips as seen in the plan view. Linear acceleration of the sensor in the carrier plane or perpendicular thereto always produces a length change in the same sense for both halves of the suspension strips to the right and left of the strip midplanes and also to a resistive change in the same sense in each of the piezoresistances on any one strip. In contrast to the foregoing, a rotary movement about an axis of rotation perpendicular to the carrier surface leads to an opposite bending of the strip halves and thereby to opposite resistance changes of the piezoresistances on the same strip. By comparison of the resistance values of the resistances it is possible to distinguish simply between linear acclerations and rotary movements by suitable circuitry in device 90. The piezoresistances may be affixed to or integrated into the strips.

Figure 2:
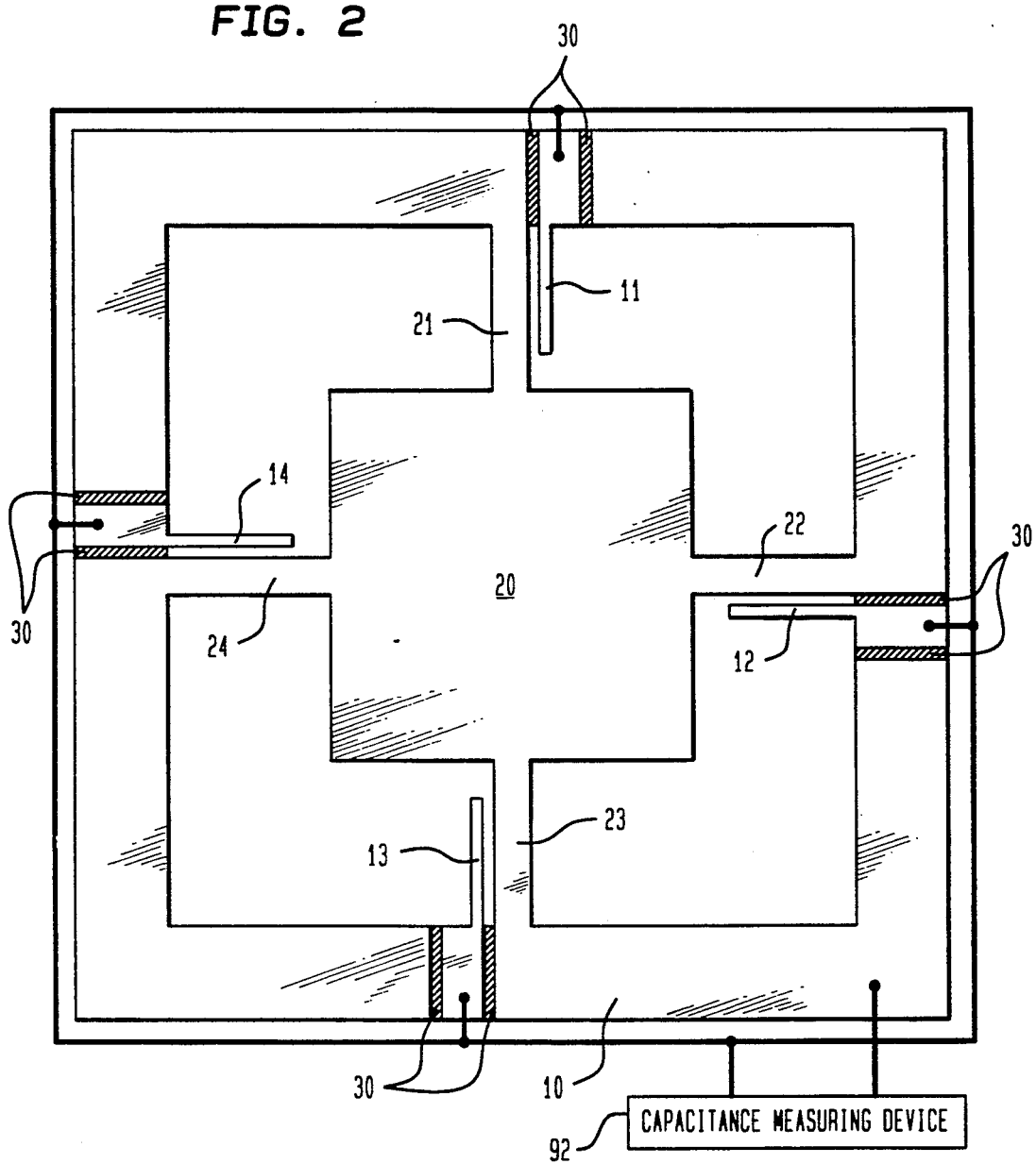
FIG. 2 is a plan view of a sensor with capacitive signal output.

FIG. 2 shows a sensor structure comparable to that shown in FIG. 1. The signal take-off, however, is not piezoresistive in this case, but capacitive. For this purpose stationary electrodes 11 to 14 extending from the stationary frame 10 in a direction parallel to the suspension strips 21 to 24 are shaped out of the carrier. The fixed electrodes 11 to 14, together with the suspension strips 21 to 24 serving as movable electrodes, provide four capacitances. The stationary electrodes 11 to 14 are so disposed relative to the movable electrodes 21 to 24 that linear acceleration in the carrier plane leads to opposite capacitance changes at every two oppositely located capacitances. Only a rotary movement about an axis of rotation perpendicular to the carrier plane leads to a capacitance change in the same sense at least two oppositely located capacitances.

A rotary movement is accordingly detected in that manner in a device 91. This sensor structure is shaped out of a two-layer silicon carrier 1, in which there is a doping transition between the upper layer 2 and the lower layer 3 of the silicon carrier 1. The strips 21 to 24 only in the upper layer 2. Insulation diffusions 30 are introduced in the frame 10 around the portions of the frame to which the strips are attached. The insulation diffusions 30 could also be provided in a suitable way throughout the portions 2 of the frame from which the electrodes 11 to 14 extend. These insulation provisions, together with the presence of the pn junction between the upper layer 2 and the lower layer 3 serve to insulate electrically the suspension strips 21 to 24 serving as movable electrodes from the stationary electrodes 11 to 14.

The etching of the substrate 3 in FIG. 2 can conveniently be done with anisotropic etching, for example with KOH, NH$_4$OH, NaOH or other hydroxide water solution. The etching stops at the epitaxial layer (or diffused pn junction) 2 if a potential is applied. This procedure is known as an electrochemical etch-stop. Sample conditions are: 40% KOH solution at 60° C., potential of 600 mV. The etching of the surface layer 2 is done, for example, with KOH in water solution or with reactive ion etching (RIE) if the layer is not too thick (E.G. 10 $\mu$m).

Figure 3:
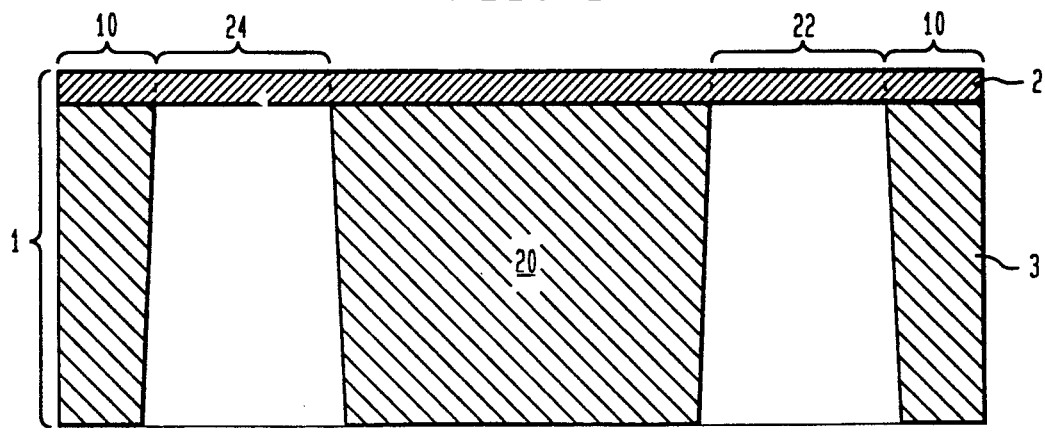
FIG. 3 is a cross section through the sensor of FIG. 2.

FIG. 3 shows a section through the sensor of FIG. 2 in the region of the strips 22 and 24. The stationary frame 10 has the full thickness of the carrier, and likewise the seismic mass 20. It is also possible, however, to reduce the seismic mass 20 overall or in part in its thickness or even to provide it only in the upper layer 2.

Figure 4:
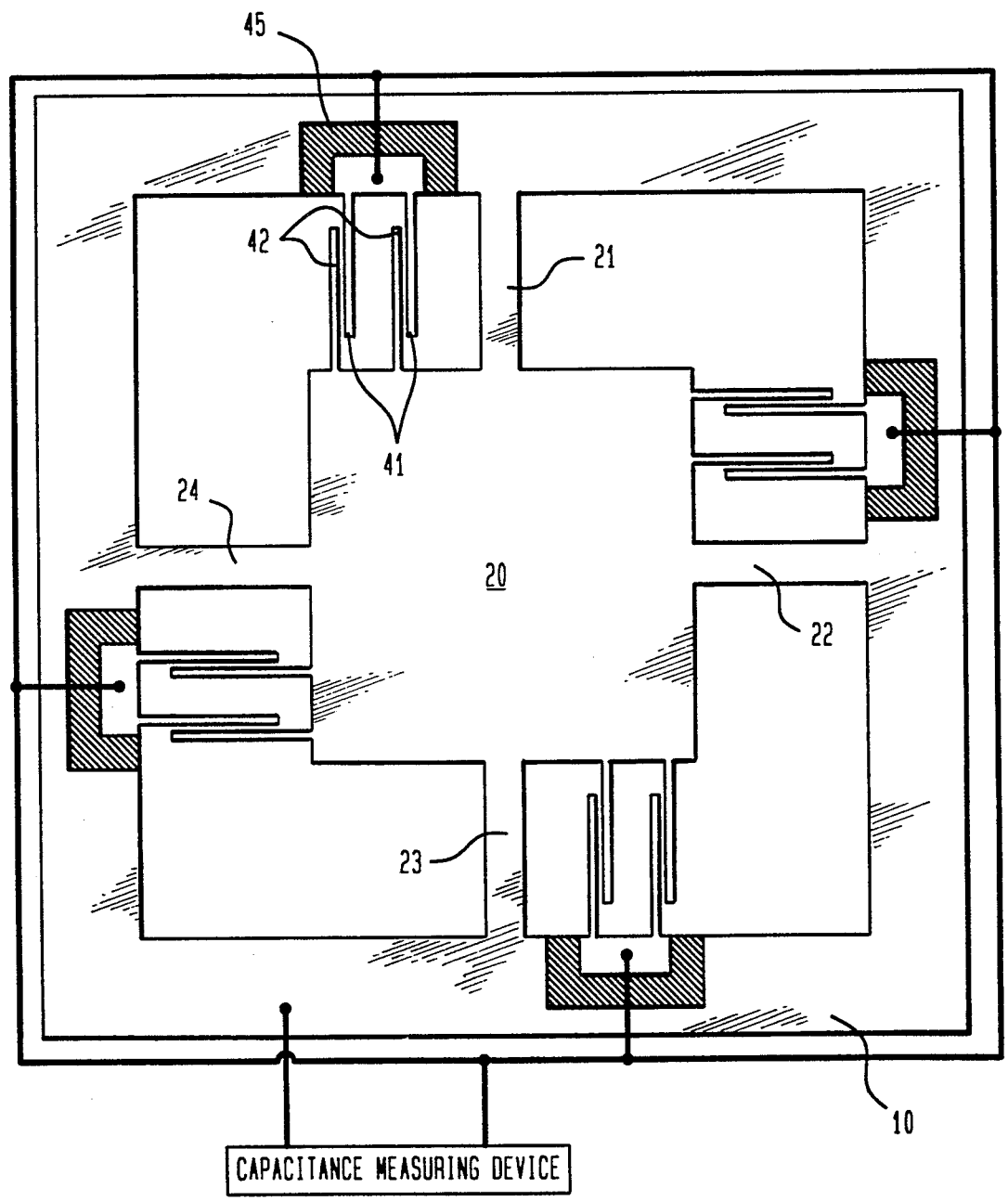
FIG. 4 is a plan view of a sensor with interditigal capacitors.

A further possibility for the insulation of the structure parts and for the signal take-off is shown in FIG. 4. Etched troughs 45 are shown which penetrate fully through the upper layer 2. The stationary electrodes 41 extending from the frame in FIG. 4 are thereby separated electrically from the movable electrodes extending from the seismic mass 20. The movable electrodes 42 together with the stationary electrodes 41 form parallel-connected interdigital capacitors that have an amplifying effect on the signal. The signal take-off is shown at 95 and 96. The manner of operation of the sensor shown in FIG. 4 corresponds to that of the sensor shown in FIGS. 2 and 3. That includes the possibility of all combinations of the signal evaluation methods, such as interdigital capacitors with the diffusion insulations shown in FIG. 2 or piezoresistive evaluation as shown in FIG. 1. Furthermore it is conceivable to provide the capacitance structures shown in FIGS. 2 and 4 not only for signal evaluation but also for positioning of the seismic mass 20 by applying a variable voltage. In this manner overload situations can be coped with better and the service life can be prolonged. The linearity of the output signal is also improved in this manner.

Figure 6A:
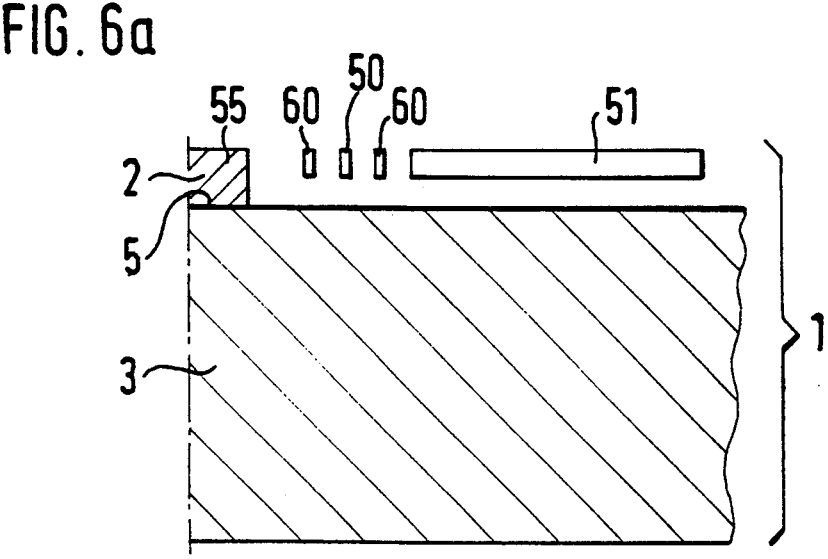
FIGS. 6a and 6b are respectively sections through the center of FIG. 5 along the chain-dotted lines A and B shown in FIG. 5.
Figure 6B:
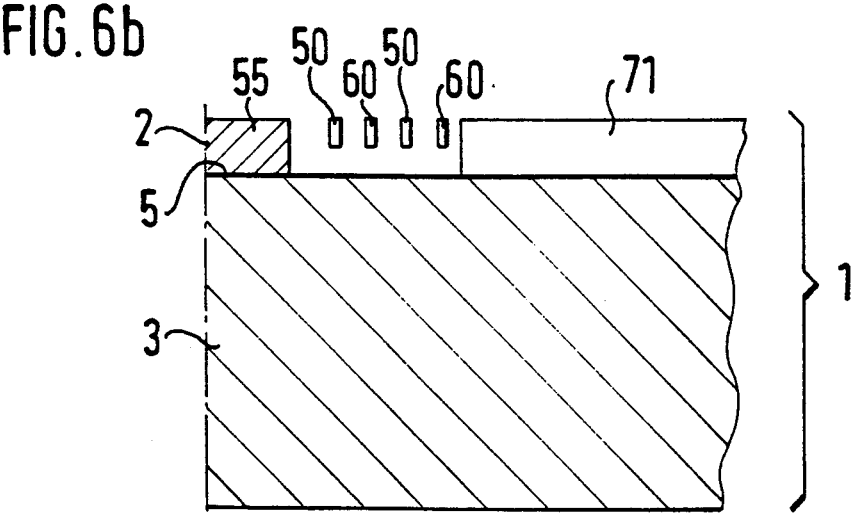

FIG. 5 shows a plan view of a sensor made of a silicon carrier 1 consisting of a substrate 3, an isolation layer 5 superposed on the substrate and a polysilicon layer 2 provided on top of the isolation layer 5. FIGS. 6a and 6b show cross sections through the sensor in planes designated by the chain-dotted lines A and B in FIG. 5. A central anchor stud 25 is shaped out of the polysilicon layer 2 which is firmly connected to the substrate 3 through the insulation layer 5. Two interlaced spirals 50 and 60 extend from the anchor stud 55 as a center. They are formed only in the polysilicon layer 2 and are not connected with the substrate 3 except through the anchor stud 5, so that they are movable as spiral springs.

On the respective outer turns of the spirals 50 and 60 movable masses 51 and 61 are similarly formed only in the polysilicon layer 2. These masses are disposed in star configuration around the anchor stud 55. They have comb-like finger structures 511 and 611 extending circumferentially on each side. The etching of surface layers in FIG. 5 and 6 is preferably done by reactive ion etching.

Similarly disposed in star configuration around the anchor stud 55 stationary electrodes 71 are disposed between the movable masses 51, 61. These stationary electrodes are connected with the substrate 3 and/or to a frame not shown in FIGS. 5, 6a and 6b. The fixed electrodes 71 also have comb-like finger structures 711. The finger structures 511, 611 of the movable masses 51, 61 and the finger structures 711 of the stationary electrodes 7 interfit between each other. These finger structures 511, 611, 711 together form interdigital capacitors or electrostatic reluctance drives which can be used for position control but also for signal measurement. A signal measurement by means of piezoresistances 111 mounted on the spirals 50 and 60 is also possible in this kind of structure.

By means of these sensors angular accelerations about an axis perpendicular to the carrier plane can be readily measured in measuring devices 93 or 94. The archimedean spirals 50 and 60 then operate as spiral springs which according to the direction of rotation expand or contract, causing the position of the movable masses 51, 61 to change relative to the stationary electrodes 71, which produces changes in the electrical conditions of the interdigital capacitors.

Although the invention has been described with reference to particular illustrative examples, it will be understood that modifications and variations are possible within the inventive concept.

I claim:

1. An angular acceleration sensor produced by removal of material from a plate-shaped silicon carrier body and composed of at least a stationary frame, a displaceable seismic mass having a rest position within said frame and a plurality of flexible connection strips by which said seismic mass is suspended from said frame, all made by removal of material from said carrier body, and further comprising:
    means for electrically detecting and measuring a rotary movement of said seismic mass about an axis perpendicular to a major surface of said plate-shaped carrier body.

2. The sensor of claim 1, wherein said frame is of square configuration and said seismic mass comprises a square upper surface and wherein at least one pair and not more than two pairs of said flexible strips are symmetrically disposed in said frame at opposite sides of said seismic mass and connect said seismic mass to said frame in such a way that in said rest position the edges of said square upper surface of said seismic mass are respectively parallel to two interior surfaces of said frame, said seismic mass being suspended in the middle of said frame and said flexible strips extending perpendicularly away from respective middles of sides of said upper surface of said seismic mass towards said frame.

3. The sensor of claim 1, wherein said measuring means include piezoresistances located on respective opposite side surfaces of said strips which are easily bent by said rotary motion.

4. The sensor of claim 2, wherein said measuring means include piezoresistances located on respective opposite side surfaces of said strips which are easily bent by said rotary motion.

5. The sensor of claim 1, wherein said flexible strips at least in part have a thickness equal to the overall thickness of said silicon carrier body, the thickness dimension of said strips being defined as corresponding to the thickness dimension of said plate-shaped carrier body.

6. The sensor of claim 2, wherein said flexible strips at least in part have a thickness equal to the overall thickness of said silicon carrier body, the thickness dimension of said strips being defined as corresponding to the thickness dimension of said plate-shaped carrier body.

7. The sensor of claim 3, wherein said flexible strips at least in part have a thickness equal to the overall thickness of said silicon carrier body, the thickness dimension of said strips being defined as corresponding to the thickness dimension of said plate-shaped carrier body.

8. The sensor of claim 4, wherein said flexible strips at least in part have a thickness equal to the overall thickness of said silicon carrier body, the thickness dimension of said strips being defined as corresponding to the thickness dimension of said plate-shaped carrier body.

9. An angular acceleration sensor produced by removal of material from a plate-shaped silicon carrier body composed predominantly of a plurality of layers, each predominantly of silicon, comprising first and second layers respectively distinguishable electrically from each other, and composed structurally of at least a stationary frame, a displaceable seismic mass having a rest position within said frame and a plurality of flexible connection strips by which said seismic mass is suspended from said frame, all made by removal of material from said carrier body and further comprising:

means for electrically detecting and measuring a rotary movement of said seismic mass about an axis perpendicular to a major surface of said plate-shaped carrier body.

10. The sensor of claim 9, wherein said frame is of square configuration, said seismic mass comprises a square upper surface and wherein at least one pair and not more than two pairs of said flexible strips are symmetrically disposed in said frame at opposite sides of said seismic mass and connect said seismic mass to said frame in such a way that in said rest position the edges of said square upper surface of said seismic mass are respectively parallel to two interior surfaces of said frame, said seismic mass being suspended in the middle of said frame and said flexible strips extending perpendicularly away from respective middles of sides of said upper surface of said seismic mass towards said frame.

11. The sensor of claim 9, wherein said measuring means include piezoresistances located on respective opposite side surfaces of said strips which are easily bent by said rotary motion.

12. The sensor of claim 10, wherein said measuring means include piezoresistances located on respective opposite side surfaces of said strips which are easily bent by said rotary motion.

13. The sensor of claim 9, wherein said first layer and said second layer are on opposite sides of a pn-junction of said carrier body.

14. The sensor of claim 10, wherein said first layer and said second layer are on opposite sides of a pn-junction of said carrier body.

15. The sensor of claim 9, wherein said frame, seismic mass and flexible strips are monocrystalline.

16. The sensor of claim 10, wherein said frame, seismic mass and flexible strips are monocrystalline.

17. The sensor of claim 9, wherein said first layer is a polycrystalline silicon layer and has material thereof removed between said frame and said seismic mass resulting in cavities that are open on a major surface of said plate-shaped carrier body.

18. The sensor of claim 10, wherein said first layer is a polycrystalline silicon layer and has material thereof removed between said frame and said seismic mass resulting in cavities that are open on a major surface of said plate-shaped carrier body.

19. The sensor of claim 9, further comprising at least one pair of stationary electrodes shaped out of said carrier body which electrodes respectively extend from each of two opposite sides of said frame towards said seismic mass, each said pair of stationary electrodes being parallel to one of said strips and disposed so that said one of said strips serves as a movable electrode forming a capacitor with said pair of stationary electrodes parallel thereto.

20. The sensor of claim 9, further comprising at least one pair of stationary electrodes shaped out of said carrier body which electrodes respectively extend from each of two opposite sides of said frame towards said seismic mass, each said pair of stationary electrodes being parallel to one of said strips and disposed so that said one of said strips serves as a movable electrode forming a capacitor with said pair of stationary electrodes parallel thereto.

21. An angular acceleration sensor produced by removal of material from a plate-shaped silicon carrier body composed predominantly of a first layer and a second layer, each predominantly of silicon and electrically distinguishable from each other, and an electrically insulating layer of silicon dioxide interposed between said first and second layers and composed structurally of at least a stationary frame, a displaceable seismic mass having a rest position within said frame and a plurality of flexible connection strips by which said seismic mass is suspended from said frame, all made by removal of material from said carrier body and further comprising:

means for electrically detecting and measuring a rotary movement of said seismic mass about an axis perpendicular to a major surface of said plate-shaped carrier body.

22. The sensor of claim 21, wherein said frame is of square configuration and said seismic mass comprises a square upper surface and wherein at least one pair and not more than two pairs of said flexible strips are symmetrically disposed in said frame at opposite sides of said seismic mass and connecting said seismic mass to said frame in such a way that in said rest position the edges of said square upper surface of said seismic mass are respectively parallel to two interior surfaces of said frame, said seismic mass being suspended in the middle of said frame and said flexible strips extending perpendicularly away from respective middles of sides of said upper surface of said seismic mass towards said frame.

23. The sensor of claim 21, wherein said measuring means include piezoresistances located on respective opposite side surfaces of said strips which are easily bent by said rotary motion.

24. The sensor of claim 22, wherein said measuring means include piezoresistances located on respective opposite side surfaces of said strips which are easily bent by said rotary motion.

25. The sensor of claim 9, wherein said flexible strips at least in part have a thickness equal to the overall thickness of said silicon carrier body, the thickness dimension of said strips being defined as corresponding to the thickness dimension of said plate-shaped carrier body.

26. The sensor of claim 10, wherein said flexible strips at least in part have a thickness equal to the overall thickness of said silicon carrier body, the thickness dimension of said strips being defined as corresponding to the thickness dimension of said plate-shaped carrier body.

27. The sensor of claim 21, wherein said flexible strips at least in part have a thickness equal to the overall thickness of said silicon carrier body, the thickness dimension of said strips being defined as corresponding to the thickness dimension of said plate-shaped carrier body.

28. The sensor of claim 22, wherein said flexible strips at least in part have a thickness equal to the overall thickness of said silicon carrier body, the thickness dimension of said strips being defined as corresponding to the thickness dimension of said plate-shaped carrier body.

29. The sensor of claim 9, wherein at least a portion of said seismic mass has a thickness equal to the overall thickness of said silicon carrier body, the thickness dimension of said seismic mass being defined as corresponding to the thickness dimension of said plate-shaped carrier body.

30. The sensor of claim 10, wherein at least a portion of said seismic mass has a thickness equal to the overall thickness of said silicon carrier body, the thickness dimension of said seismic mass being defined as corresponding to the thickness dimension of said plate-shaped carrier body.

31. The sensor of claim 21, wherein at least a portion of said seismic mass has a thickness equal to the overall thickness of said silicon carrier body, the thickness dimension of said seismic mass being defined as corresponding to the thickness dimension of said plate-shaped carrier body.

32. The sensor of claim 22, wherein at least a portion of said seismic mass has a thickness equal to the overall thickness of said silicon carrier body, the thickness dimension of said seismic mass being defined as corresponding to the thickness dimension of said plate-shaped carrier body.

33. The sensor of claim 21, further comprising at least one pair of stationary electrodes shaped out of said carrier body which electrodes respectively extend from each of two opposite sides of said frame towards said seismic mass, each said pair of stationary electrodes being parallel to one of said strips and disposed so that said one of said strips serves as a movable electrode forming a capacitor with said pair of stationary electrodes parallel thereto.

34. The sensor of claim 22, further comprising at least one pair of stationary electrodes shaped out of said carrier body which electrodes respectively extend from each of two opposite sides of said frame towards said seismic mass, each said pair of stationary electrodes being parallel to one of said strips and disposed so that said one of said strips serves as a movable electrode forming a capacitor with said pair of stationary electrodes parallel thereto.

35. The sensor of claim 9, further comprising at least a pair of parallel stationary electrodes shaped out of said carrier body which electrodes respectively extend from each of two opposite sides of said frame towards said seismic mass and at least a pair of parallel movable electrodes which respectively extend from each of two opposite sides of said seismic mass which sides are disposed so as to provide a capacitor on each side of said seismic mass.

36. The sensor of claim 10, further comprising at least a pair of parallel stationary electrodes shaped out of said carrier body which electrodes respectively extend from each of two opposite sides of said frame towards said seismic mass and at least a pair of parallel movable electrodes which respectively extend from each of two opposite sides of said seismic mass which sides are disposed so as to provide a capacitor on each side of said seismic mass.

37. The sensor of claim 21, further comprising at least a pair of parallel stationary electrodes shaped out of said plate-shaped carrier body which electrodes respectively extend from each of two opposite sides of said frame towards said seismic mass and at least a pair of parallel movable electrodes which respectively extend from each of two opposite sides of said seismic mass which respectively are disposed so as to provide a capacitor on each side of said seismic mass.

38. The sensor of claim 22, further comprising at least a pair of parallel stationary electrodes shaped out of said carrier body which electrodes respectively extend from each of two opposite sides of said frame towards said seismic mass and at least a pair of parallel movable electrodes which respectively extend from each of two opposite sides of said seismic mass which sides are disposed so as to provide a capacitor on each side of said seismic mass.

39. The sensor of claim 19, wherein said flexible strips are provided only in said first layer of said plate-shaped carrier body and wherein said stationary electrodes are isolated from said frame by a pn-junction.

40. The sensor of claim 20, wherein said flexible strips are provided only in said first layer of said plate-shaped carrier body and wherein said stationary electrodes are isolated from said frame by a pn-junction.

41. The sensor of claim 33, wherein said flexible strips are provided only in said first layer of said plate-shaped carrier body and wherein said stationary electrodes are isolated from said frame by an insulation layer interposed between said first and second layers and isolation diffusions in said first layer.

42. The sensor of claim 34, wherein said flexible strips are provided only in said first layer of said plate-shaped carrier body and wherein said stationary electrodes are isolated from said frame by a pn-junction.

43. The sensor of claim 35, wherein said flexible strips are provided only in said first layer of said plate-shaped carrier body and wherein said stationary electrodes are isolated from said frame by a pn-junction.

44. The sensor of claim 36, wherein said flexible strips are provided only in said first layer of said plate-shaped carrier body and wherein said stationary electrodes are isolated from said frame by a pn-junction.

45. The sensor of claim 37, wherein said flexible strips are provided only in said first layer of said plate-shaped carrier body and wherein said stationary electrodes are isolated from said frame by an insulation layer interposed between said first and second layers and isolation diffusions in said first upper layer.

46. The sensor of claim 38, wherein said flexible strips are provided only in said first layer of said plate-shaped carrier body and wherein said stationary electrodes are isolated from said frame by an insulation layer interposed between said first and second layers and isolation diffusions in said first layer.

47. The sensor of claim 19, wherein said flexible strips are provided only in said first layer of said plate-shaped carrier body and wherein said stationary electrodes are isolated from said frame by an insulation layer interposed between said first and second layers and isolation diffusions in said first layer.

48. The sensor of claim 20, wherein said flexible strips are provided only in said first layer of said plate-shaped carrier body and wherein said stationary electrodes are isolated from said frame by an insulation layer interposed between said first and second layers and isolation diffusions in said first layer.

49. The sensor of claim 33, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

50. The sensor of claim 34, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

51. The sensor of claim 35, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

52. The sensor of claim 36, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

53. The sensor of claim 37, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

54. The sensor of claim 38, wherein said flexible strips are provided only in said first layer of said plate-shaped carrier body and wherein said stationary electrodes are isolated from said frame by an insulation layer interposed between said first and second layers and in each case also by etched troughs penetrating fully through said first layer.

55. An angular acceleration sensor produced by removal of material from a plate-shaped carrier body predominantly of silicon and composed of a substrate (3), an insulation layer (5) overlying said substrate and a polycrystalline layer (2) overlying said insulation layer and further comprising:
   an anchor stud (55) shaped out of said polycrystalline layer and firmly affixed to said substrate;
   a pair of interlaced spirals (50, 60) extending from said anchor stud as a mid-location, shaped out of said polycrystalline layer and unconnected with said substrate except through said anchor stud;
   masses (51, 61) shaped out of said polycrystalline layer distributed in star configuration relative to said anchor stud and each connected to an outer turn of one of said spirals;
   finger structures (511, 611) shaped out of said polycrystalline layer and extending circumferentially from each of said masses;
   stationary electrodes (71) shaped out of said polycrystalline layer, connected to said substrate through said insulation layer (5) and disposed in star configuration relative to said another stud and having finger structures (711) interfitting between said finger structures of said masses; and
   means (93, 94) for electrically detecting and measuring rotary movement of said masses (51, 61) about an axis perpendicular to a major surface of said plate-shaped carrier body.

56. The sensor of claim 55, wherein piezoresistances (111) are mounted on each of said spirals (50, 60) for sensing expansion and contraction of said spirals.

57. The sensor of claim 55, wherein said means (94) for electrically measuring rotary movement are for measuring the capacitance between said stationary electrodes and said masses (51, 61) connected to respective outer turns respectively of said spirals.

58. The sensor of claim 1, wherein at least a portion of said seismic mass has a thickness equal to the overall thickness of said silicon carrier body, the thickness dimension of said seismic mass being defined as corresponding to the thickness dimension of said plate-shaped carrier body.

59. The sensor of claim 2, wherein at least a portion of said seismic mass has a thickness equal to the overall thickness of said silicon carrier body, the thickness dimension of said seismic mass being defined as corresponding to the thickness dimension of said plate-shaped carrier body.

60. The sensor of claim 3, wherein at least a portion of said seismic mass has a thickness equal to the overall thickness of said silicon carrier body, the thickness dimension of said seismic mass being defined as corresponding to the thickness dimension of said plate-shaped carrier body.

61. The sensor of claim 4, wherein at least a portion of said seismic mass has a thickness equal to the overall thickness of said silicon carrier body, the thickness dimension of said seismic mass being defined as corresponding to the thickness dimension of said plate-shaped carrier body.

* * * * *